United States Patent
Avakian

(10) Patent No.: US 10,672,032 B2
(45) Date of Patent: Jun. 2, 2020

(54) INTELLIGENT MARKETING AND ADVERTISING PLATFORM

(71) Applicant: Arsen Avakian, Chicago, IL (US)

(72) Inventor: Arsen Avakian, Chicago, IL (US)

(73) Assignee: Cooler Screens Inc., Chicago, IL (US)

( * ) Notice: Subject to any disclaimer, the term of this patent is extended or adjusted under 35 U.S.C. 154(b) by 198 days.

(21) Appl. No.: 15/674,198

(22) Filed: Aug. 10, 2017

(65) Prior Publication Data

US 2019/0050900 A1    Feb. 14, 2019

(51) Int. Cl.
| | |
|---|---|
| *G06Q 30/00* | (2012.01) |
| *G06Q 30/02* | (2012.01) |
| *G06F 3/147* | (2006.01) |
| *G09F 23/00* | (2006.01) |
| *G06Q 30/06* | (2012.01) |
| *G06F 3/041* | (2006.01) |
| *G06Q 10/00* | (2012.01) |

(52) U.S. Cl.
CPC ......... *G06Q 30/0261* (2013.01); *G06F 3/147* (2013.01); *G06F 3/0412* (2013.01); *G06K 2209/17* (2013.01); *G06Q 10/20* (2013.01); *G06Q 30/0251* (2013.01); *G06Q 30/0643* (2013.01); *G09F 2023/0033* (2013.01); *G09G 2380/04* (2013.01); *G09G 2380/06* (2013.01)

(58) Field of Classification Search
CPC ....... G06Q 30/0207–30/0277; G06Q 30/0643; G09F 2023/0033; G06K 2209/17
See application file for complete search history.

(56) References Cited

U.S. PATENT DOCUMENTS

| | | | |
|---|---|---|---|
| 2,002,322 | A | 5/1935 | Kraemer |
| 4,371,870 | A | 2/1983 | Biferno |
| 4,671,582 | A | 6/1987 | Stromquist et al. |
| 4,893,902 | A | 1/1990 | Baughman et al. |
| 4,998,382 | A | 3/1991 | Kostos et al. |
| 5,024,023 | A | 6/1991 | Kostos et al. |

(Continued)

FOREIGN PATENT DOCUMENTS

| | | |
|---|---|---|
| DE | 10205405 A1 | 8/2003 |
| DE | 102009003127 A1 | 11/2010 |

(Continued)

OTHER PUBLICATIONS

Neff, Jack. "New System Puts Video Ads on Store Cooler Doors", AdAge, https://adage.com/article/cmo-strategy/system-puts-video-ads-store-cooler-doors/301395, Nov. 18, 2015. (Year: 2015).*

(Continued)

*Primary Examiner* — Michael Bekerman
(74) *Attorney, Agent, or Firm* — Banner & Witcoff, Ltd.

(57) ABSTRACT

An intelligent marketing and advertising platform which provides an innovative merchandising solution for retailers by effectively transforming the glass surface of retail product containers (such as cooler doors) into a non-transparent display of planograms. The merchandising solution provides for digital planograms and pricing management, real time promotional updates and sales data, etc. This is accomplished by converting/transforming the simple glass surface of a retail product container (such as cooler/freezer doors) into digital "smart" screens that provide for innovative advertising solutions.

14 Claims, 5 Drawing Sheets

System Architecture: Display array with sensors and cameras driven by Remote/Networked video controllers and encased in protective enclosure

(56) References Cited

U.S. PATENT DOCUMENTS

| | | |
|---|---|---|
| 5,111,618 A | 5/1992 | Kaspar et al. |
| 5,116,274 A | 5/1992 | Artwohl et al. |
| 5,255,473 A | 10/1993 | Kaspar et al. |
| 5,270,843 A | 12/1993 | Wang |
| 5,645,330 A | 7/1997 | Artwohl et al. |
| 6,005,652 A | 12/1999 | Matsuhira |
| 6,148,563 A | 11/2000 | Roche et al. |
| 6,377,228 B1 | 4/2002 | Jenkin et al. |
| 6,427,772 B1 | 8/2002 | Oden et al. |
| 6,475,087 B1 | 11/2002 | Cole |
| 6,476,885 B1 | 11/2002 | Murray et al. |
| 6,606,832 B2 | 8/2003 | Richardson et al. |
| 6,606,833 B2 | 8/2003 | Richardson et al. |
| 6,874,903 B2 | 4/2005 | Yang et al. |
| 7,072,096 B2 | 7/2006 | Holman et al. |
| 7,121,675 B2 | 10/2006 | Ter-Hovhannisian |
| 7,259,359 B2 | 8/2007 | Davey et al. |
| 7,290,707 B2 | 11/2007 | Sawasaki |
| 7,319,407 B2 | 1/2008 | Jang et al. |
| 7,377,125 B2 | 5/2008 | Seiden et al. |
| 7,413,233 B1 | 8/2008 | Jung |
| 7,513,637 B2 | 4/2009 | Kelly et al. |
| 7,593,867 B2 | 9/2009 | Deakin et al. |
| 7,824,056 B2 | 11/2010 | Madireddi et al. |
| 7,870,686 B2 | 1/2011 | Hines |
| 7,934,384 B2 | 5/2011 | Tuskiewicz et al. |
| 7,978,184 B2 | 7/2011 | Morrison |
| 8,009,864 B2 | 8/2011 | Linaker et al. |
| 8,189,855 B2 | 5/2012 | Opalach et al. |
| 8,219,438 B1 | 7/2012 | Moon et al. |
| 8,468,059 B2 | 6/2013 | Enqvist |
| 8,630,924 B2 | 1/2014 | Groenevelt et al. |
| 8,672,427 B2 | 3/2014 | Hammonds |
| 8,683,745 B2 | 4/2014 | Artwohl et al. |
| 8,955,261 B2 | 2/2015 | Kobe et al. |
| 8,972,291 B2 | 3/2015 | Rimnac et al. |
| 9,046,294 B2 | 6/2015 | Lee et al. |
| 9,052,536 B2 | 6/2015 | Artwohl et al. |
| 9,098,825 B2 | 8/2015 | Bashkin |
| 9,144,328 B2 | 9/2015 | Seeley |
| 9,361,628 B2 | 6/2016 | Stark |
| 9,514,661 B2 | 12/2016 | Riegel |
| 9,560,777 B2 | 1/2017 | Krietzman et al. |
| 9,575,558 B2 | 2/2017 | Almen et al. |
| 9,710,992 B2 | 7/2017 | Borra |
| 9,881,528 B2 | 1/2018 | Dunn |
| 9,911,377 B2 | 3/2018 | Howard et al. |
| 9,972,284 B2 | 5/2018 | Lee et al. |
| 10,062,257 B2 | 8/2018 | Chau |
| 10,085,571 B2 | 10/2018 | Schiffman et al. |
| 10,126,849 B2 | 11/2018 | Lee et al. |
| 10,258,170 B2 | 4/2019 | Dunn et al. |
| 10,282,695 B1 | 5/2019 | McNamara et al. |
| 10,360,571 B2 | 7/2019 | Garel et al. |
| 2001/0010516 A1 | 8/2001 | Roh et al. |
| 2001/0052741 A1 | 12/2001 | Yun |
| 2002/0007486 A1 | 1/2002 | Yun |
| 2003/0038912 A1 | 2/2003 | Broer et al. |
| 2003/0117790 A1 | 6/2003 | Lee et al. |
| 2003/0205059 A1 | 11/2003 | Roche et al. |
| 2003/0207090 A1 | 11/2003 | Arora |
| 2003/0214619 A1 | 11/2003 | Masuda et al. |
| 2004/0073334 A1 | 4/2004 | Terranova |
| 2004/0093379 A1 | 5/2004 | Roh et al. |
| 2004/0144328 A1 | 7/2004 | Bonner et al. |
| 2004/0160388 A1 | 8/2004 | O'Keeffe |
| 2004/0194388 A1 | 10/2004 | Roche et al. |
| 2005/0068629 A1 | 3/2005 | Fernando et al. |
| 2005/0172654 A1 | 8/2005 | Rohrer et al. |
| 2005/0202178 A1 | 9/2005 | Roche et al. |
| 2005/0265019 A1 | 12/2005 | Sommers et al. |
| 2006/0103269 A1 | 5/2006 | Artwohl et al. |
| 2006/0127586 A1 | 6/2006 | Roche et al. |
| 2006/0145576 A1 | 7/2006 | Lee et al. |
| 2006/0158579 A1 | 7/2006 | Hasegawa |
| 2006/0174641 A1 | 8/2006 | Liu et al. |
| 2006/0192767 A1 | 8/2006 | Murakami |
| 2007/0003700 A1 | 1/2007 | Roche et al. |
| 2007/0016478 A1 | 1/2007 | Hill |
| 2007/0024822 A1 | 2/2007 | Cortenraad et al. |
| 2007/0058114 A1 | 3/2007 | Niiyama et al. |
| 2007/0076431 A1 | 4/2007 | Atarashi et al. |
| 2007/0151274 A1 | 7/2007 | Roche et al. |
| 2007/0162182 A1 | 7/2007 | Marti et al. |
| 2007/0171647 A1 | 7/2007 | Artwohl et al. |
| 2007/0193280 A1 | 8/2007 | Tuskiewicz et al. |
| 2007/0195535 A1 | 8/2007 | Artwohl et al. |
| 2007/0216657 A1 | 9/2007 | Konicek |
| 2008/0004950 A1 | 1/2008 | Huang et al. |
| 2008/0024047 A1 | 1/2008 | Juo et al. |
| 2008/0158858 A1 | 7/2008 | Madireddi et al. |
| 2009/0002990 A1 | 1/2009 | Becker et al. |
| 2009/0036208 A1 | 2/2009 | Pennington et al. |
| 2009/0052206 A1 | 2/2009 | Matsui et al. |
| 2009/0121970 A1 | 5/2009 | Ozbek |
| 2009/0146945 A1 | 6/2009 | Cho |
| 2009/0276319 A1 | 11/2009 | Lungu et al. |
| 2009/0295731 A1 | 12/2009 | Kim et al. |
| 2009/0306820 A1 | 12/2009 | Simmons et al. |
| 2010/0013925 A1 | 1/2010 | Fowler et al. |
| 2010/0026912 A1 | 2/2010 | Ho |
| 2010/0043293 A1 | 2/2010 | Nicholson et al. |
| 2010/0062152 A1 | 3/2010 | Roche et al. |
| 2010/0068398 A1 | 3/2010 | Roche et al. |
| 2010/0083672 A1 | 4/2010 | Yoon et al. |
| 2010/0119705 A1 | 5/2010 | Roche et al. |
| 2010/0152892 A1 | 6/2010 | Gavra et al. |
| 2010/0180615 A1 | 7/2010 | Linder et al. |
| 2010/0214786 A1 | 8/2010 | Nichol |
| 2010/0275477 A1 | 11/2010 | Kim |
| 2010/0293827 A1 | 11/2010 | Suss et al. |
| 2011/0083460 A1 | 4/2011 | Thomas et al. |
| 2011/0098849 A1 | 4/2011 | Hudis et al. |
| 2011/0116231 A1 | 5/2011 | Dunn et al. |
| 2011/0141011 A1 | 6/2011 | Lashina et al. |
| 2011/0150276 A1 | 6/2011 | Eckhoff et al. |
| 2011/0173082 A1* | 7/2011 | Breitenbach ...... G06Q 10/06311 |
| | | 705/16 |
| 2011/0181792 A1 | 7/2011 | Hammonds |
| 2012/0004769 A1 | 1/2012 | Hallenbeck et al. |
| 2012/0105424 A1 | 5/2012 | Lee et al. |
| 2012/0285089 A1* | 11/2012 | Artwohl ............... A47F 3/0434 |
| | | 49/70 |
| 2013/0063326 A1* | 3/2013 | Riegel ..................... G09F 9/33 |
| | | 345/4 |
| 2013/0271696 A1 | 10/2013 | Dunn |
| 2014/0078407 A1 | 3/2014 | Green et al. |
| 2014/0126829 A1* | 5/2014 | Seeley ............... G06K 9/00671 |
| | | 382/218 |
| 2014/0129393 A1 | 5/2014 | Soon-Shiong |
| 2014/0232958 A1 | 8/2014 | Venturas et al. |
| 2014/0344118 A1 | 11/2014 | Parpia et al. |
| 2015/0073590 A1 | 3/2015 | Garcia Manchado et al. |
| 2016/0143459 A1 | 5/2016 | Clein |
| 2016/0220039 A1* | 8/2016 | Chang .................... A47F 3/043 |
| 2017/0027339 A1 | 2/2017 | Chang et al. |
| 2017/0046991 A1 | 2/2017 | Riegel |
| 2017/0124603 A1 | 5/2017 | Olson |
| 2017/0147971 A1 | 5/2017 | Morse et al. |
| 2017/0329078 A1* | 11/2017 | Dunn ..................... A47F 3/043 |
| 2018/0020847 A1 | 1/2018 | Dunn et al. |
| 2018/0053226 A1* | 2/2018 | Hutton ................... G06Q 20/18 |
| 2018/0061283 A1 | 3/2018 | Kim et al. |
| 2018/0103778 A1 | 4/2018 | Olovsson |
| 2018/0226056 A1 | 8/2018 | Chan |
| 2018/0335252 A1* | 11/2018 | Oh ....................... G06K 9/6256 |
| 2018/0365630 A1 | 12/2018 | Seals et al. |
| 2019/0050900 A1 | 2/2019 | Avakian |

FOREIGN PATENT DOCUMENTS

| | | |
|---|---|---|
| EP | 2194222 A2 | 6/2010 |
| JP | 2003125904 A | 5/2003 |

(56) References Cited

FOREIGN PATENT DOCUMENTS

| JP | 2014206320 A | 10/2014 |
|---|---|---|
| JP | 2015169412 A | 9/2015 |
| KR | 20150093289 A | 8/2015 |
| WO | 9838547 A1 | 9/1998 |
| WO | 2017127035 A1 | 7/2017 |

OTHER PUBLICATIONS

Advertising with Transparent LCD Displays; http://www.displays2go.com/Article/Advertising-Transparent-LCD-Displays-78; Jul. 28, 2016.
http://emotivev.com/products; at least as early as Jun. 5, 2017.
https://www.youtube.com/watch?v=2tlM9IereLc; at least as early as Jun. 5, 2017.
Extended EP Search Report for EP 12782036, dated Jun. 9, 2015, 7 Pages.
U.S. Notice of Allowance on U.S. Appl. No. 14/170,378, dated Mar. 31, 2015, 10 Pages.
File History of U.S. Appl. No. 16/547,288, filed Aug. 21, 2019.
File History of U.S. Appl. No. 15/888,210, filed Feb. 5, 2018 (Pt.1. 349 pages).
File History of U.S. Appl. No. 15/888,210, filed Feb. 5, 2018 (Pt. 2. 350 pages).
File History of U.S. Appl. No. 14/819,257, filed Aug. 5, 2015, (U.S. Pat. No. 9,504,338).
File History of U.S. Appl. No. 14/686,958, filed Apr. 15, 2015, (U.S. Pat. No. 9,155,405).
File History of U.S. Appl. No. 14/170,378, filed Jan. 31, 2004, (U.S. Pat. No. 9,052,536).
File History of U.S. Appl. No. 13/286,053, filed Oct. 31, 2011, (U.S. Pat. No. 8,683,745).
File History of U.S. Appl. No. 61/484,616, filed May 10, 2011.
Oct. 24, 2018—(WO) International Search Report and Written Opinion—App PCT/US2018/046103.
International Search Report of PCT/US19/66869 dated Mar. 16, 2020.
Written Opinion of the ISA of PCT/US19/66869 dated Mar. 16, 2020.

* cited by examiner

Platform Stack

System Architecture: Display array with sensors and cameras driven by Remote/Networked video controllers and encased in protective enclosure

INTELLIGENT MARKETING AND ADVERTISING PLATFORM

BACKGROUND

The present invention generally relates to merchandising solutions, and more specifically relates to an intelligent marketing and advertising platform which employs digital "smart" screens on retail product containers thereby providing an innovative advertising solution.

Although more and more people are purchasing items online, brick and mortar retail sales are still substantial and are, in fact, growing in certain market segments such as grocery, drug and convenience stores. Over 75 percent of shopping in brick and mortar stores is impulse purchasing. Research shows that impulse decisions are highly influenced by in-store messaging, and that most of that in-store impulse shopping occurs at retail product containers, such as coolers and freezers.

If impulse shopping behavior can be disrupted by what is displayed on a retail product container, such as cooler or freezer doors, this would present an enormous value creation opportunity for both consumer packaged goods brands and retailers. Arguably, coolers are the most overlooked, least promoted, least technology sophisticated and one of the most operationally challenged sections of a retail store.

Conventional retail product containers such as coolers, freezers, vending machines, etc. have a glass panel or door through which a customer views products stored in the retail product container and which are available for purchase. Problems with this approach include the fact that oftentimes products stored therein are not neatly presented, products are blocked by other products such that a customer cannot easily see what products are available for purchase, etc. Still further, store employees are required to maintain the appearance of the products stored therein, keep track of stock, install and swap out promotional tags and other displays (such as displays relating to pricing and promotions) in order to keep those items current.

SUMMARY

An object of an embodiment of the present invention is to provide an intelligent marketing and advertising platform.

Briefly, an embodiment of the present invention provides an intelligent marketing and advertising platform which comprises a plurality of retail product containers (such as coolers, freezers and/or vending machines). Each retail product container has internal storage volume, and each comprises at least one non-transparent display which prohibits viewing of the internal storage volume of the retail product container. Each retail product container further comprises customer-detecting hardware and inventory-taking hardware.

The platform also comprises a controller/data collector which is in communication with the retail product containers. The controller/data collector is configured to control the at least one non-transparent display of each retail product container such that each non-transparent display provides a planogram relating to retail products physically contained in the internal storage volume of the retail product container based on inventory taken by the controller/data collector using the inventory-taking hardware of the retail product container.

The controller/data collector is preferably configured to control the at least one non-transparent display of each retail product container to display current pricing information regarding products physically contained in the internal storage volume of the retail container, wherein the pricing is dictated by the controller/data collector.

The controller/data collector is preferably configured to detect customers using the customer-detecting hardware, and is configured to display promotions on the at least one non-transparent display of each retail product container based on what is detected by the controller/data collector using the customer-detecting hardware.

The intelligent marketing and advertising platform provides an innovative merchandising solution for retailers by effectively transforming the glass surface of retail product containers (such as cooler doors) into a non-transparent display of planograms. The merchandising solution disclosed herein provides for digital planograms and pricing management, real time promotional updates and sales data, etc. The advertising method innovation for in-store retail signage disclosed herein is effectively accomplished by converting/transforming the simple glass surface of a retail product container (such as cooler/freezer doors) into digital "smart" screens that provide for innovative advertising solutions.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF AN ILLUSTRATED EMBODIMENT

Figure 1:
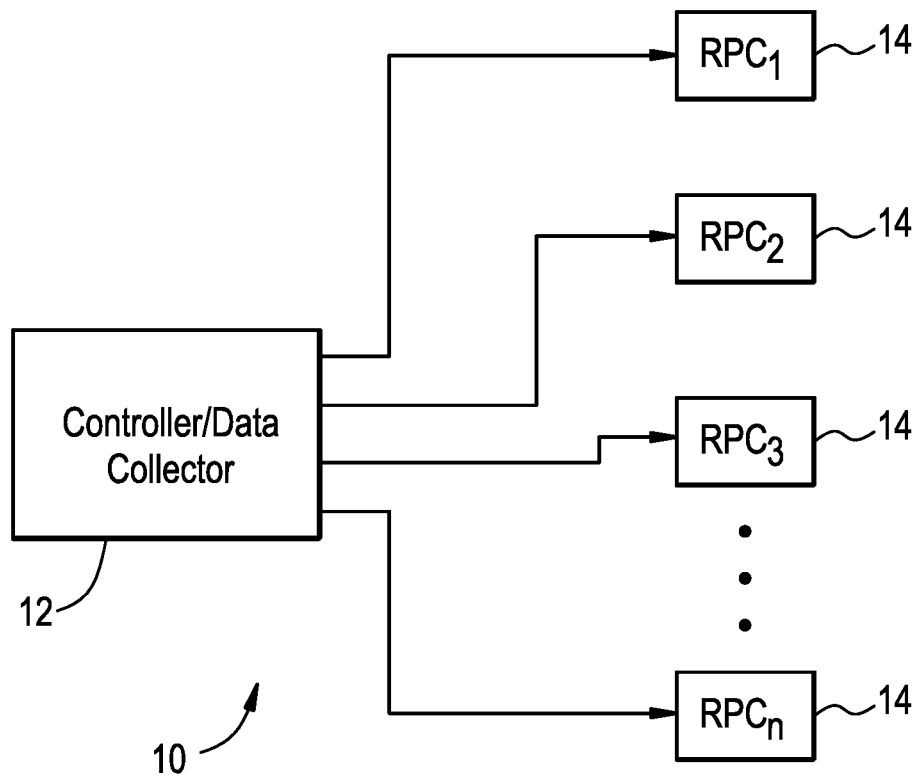
FIG. 1 illustrates an intelligent marketing and advertising platform which provides that a controller/data collector is networked with a plurality of retail product containers.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

FIG. 1 illustrates an intelligent marketing and advertising platform 10 which in accordance with an embodiment of the present invention. As shown, the intelligent marketing and advertising platform 10 provides that a controller/data collector 12 is networked with a plurality of retail product containers 14.

The retail product containers 14 need not be the same, but preferably each is a device such as a cooler, freezer and/or vending machine. Regardless, preferably each has internal storage volume in which products for purchase can be stored.

Figure 2:
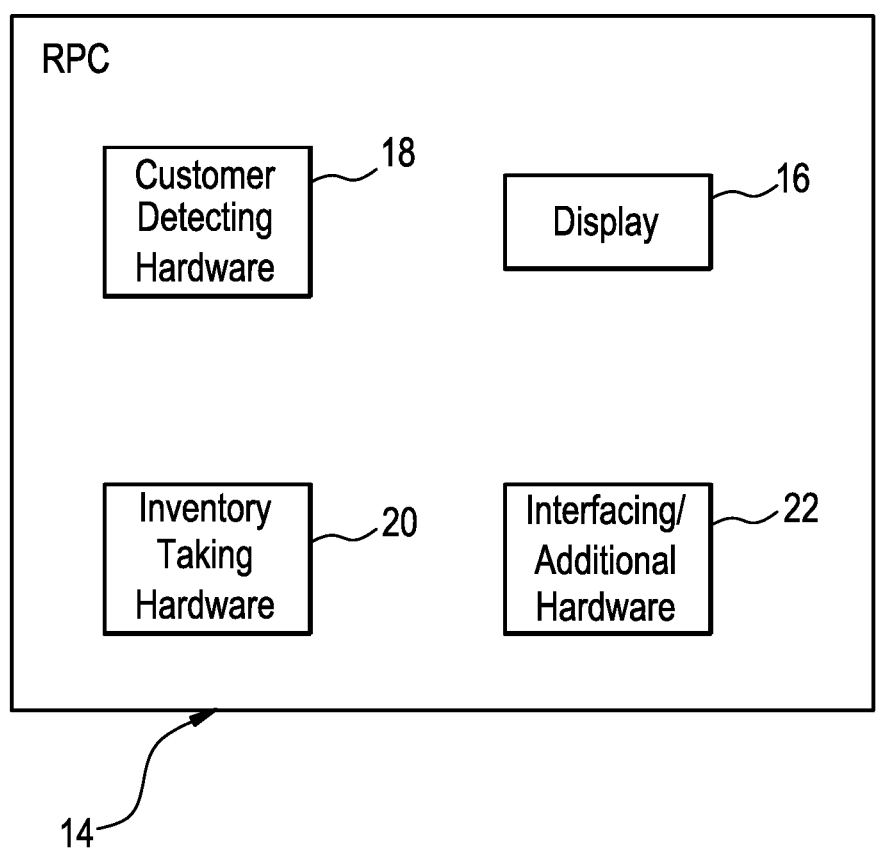
FIG. 2 illustrates some of the components of one of the retail product containers of the intelligent marketing and advertising platform illustrated in FIG. 1.

A shown in FIG. 2, preferably each retail product container 14 comprises at least one display 16, such as a display on a door of the retail product container 14. Preferably, the display 16 comprises a non-transparent display which prohibits customers from viewing, through the display, products which are being stored in the internal storage volume. The display 16 can comprise, for example, a touchscreen LCD with which customers can interact.

Preferably, each retail product container 14 further comprises customer-detecting hardware 18, such as one or more proximity sensors (such as heat maps), facial sensors or scanners, and eye-sensors (i.e., iris-tracking sensors).

Preferably, each retail product container further comprises inventory-taking hardware 20 such as cameras.

As shown in FIG. 1, the controller/data collector 12 is networked (preferably a cloud network) with the retail product containers 14, such as via conventional means, such the Internet, Bluetooth, etc., via wired Ethernet, wireless LAN or a cellular network. The controller/data collector 12 is configured to control the displays 16 of the retail product containers 14, as well as is configured to receive information from the retail product containers 14, such as information from the displays 16 (such as information regarding touch-screen interactions), as well as information from the customer-detecting hardware 18 and inventory-taking hardware 20 of the retail product containers 14. As shown, each retail product container 14 includes interfacing/additional hardware 22 which is configured to facilitate, among other things, the networking and transfer of information (i.e., data) between the controller/data collector 12 and the retail product container 14 and overall control and function of the display 16, customer-detecting hardware 18 and inventory-taking hardware 20.

The controller/data collector 12 may comprise a server having one or more processors, memory storage, a user interface, etc. and is configured to not only dictate what is displayed on the displays 16 of the retail product containers 14 and receive information and data from the retail product containers 14, but is also preferably configured to perform analytics based on information and data which has been received.

Preferably, the controller/data collector 12 is configured to control the display 16 of each retail product container 14 such that each display 16 provides planograms relating to retail products physically contained in the internal storage volume of the retail product container 14 (but not viewable through the display 16) based on inventory taken by the controller/data collector 12 using the inventory-taking hardware 20 of the retail product container 14. As such, there is no downside to the fact that, in reality, products stored in the retail product container 14 may not be neatly stored therein, or that products stored therein may be blocked from view by other products stored therein. The planograms which are displayed on the displays 16 of the retail product containers 14 effectively optimize what is presented to the customer.

Preferably, the controller/data collector 12 is configured to control the display 16 of each retail product container 14 to display current pricing information regarding products physically contained in the internal storage volume of the retail product container 14, wherein the pricing is dictated by the controller/data collector 12.

Preferably, the controller/data collector 12 is configured to detect customers using the customer-detecting hardware 18, and is configured to display promotions on the at least display 16 based on what is detected by the controller/data collector 12 using the customer-detecting hardware 18.

As discussed above, the controller/data collector 12 effectively takes an inventory of each retail product container 14 (i.e., using the inventory-taking hardware 20 along with image recognition software). Preferably, the controller/data collector 12 is configured to transmit data to a distributor and/or store regarding overall stock relating to the inventory of the plurality of retail product containers 14. More specifically, the overall system can be configured to issue restock notifications, provide merchandising updates, pricing management, real time sales data and behavioral consumer analytics. As such, the system provides advertising, flawless merchandising, real time pricing and promotions, an inventory and direct store delivery solution and the power of analytics.

It should be noted that FIG. 2 only depicts some of the components of a retail product container 14 and the retail product container 14 will inevitably include other components, such as possibly a refrigeration unit, etc. which are not specifically relevant to the present invention.

The intelligent marketing and advertising platform provides an innovative merchandising solution for retailers by effectively transforming the glass surface of retail product containers (such as cooler doors) into a non-transparent display of planograms. The merchandising solution disclosed herein provides for digital planograms and pricing management, real time promotional updates and sales data, etc. The advertising method innovation for in-store retail signage disclosed herein is effectively accomplished by converting/transforming the simple glass surface of a retail product container (such as cooler/freezer doors) into digital "smart" screens that provide for innovative advertising solutions.

As a business model, the cooler doors of a retail store can be retrofit with "smart" cooler doors having displays, cameras and sensors that collectively measure, react, learn and communicate in order to optimize the metrics.

The intelligent marketing and advertising platform disclosed herein effectively prides for at least the following: the convergence of a brick and mortar retail establishment with e-commerce; in-store promotions as an electronic marketplace; real time and algorithmic-driven pricing and promotions; self-learning/machine-learning artificial intelligence algorithm-driven advertising which is personalized to a given consumer; behavior response and external data (i.e. weather, events, competition, etc.); and smart-sensor and digital merchandising for planogram compliance, automatic-restock, in-store audits, etc.

The advertising method for in-store retail signage disclosed herein effectively employs two primary technologies—large scale brand/product advertising rotations and planogram screens (preferably activated when a customer gets within three feet) with non-obtrusive ad banners or hot-spots.

Figure 3:
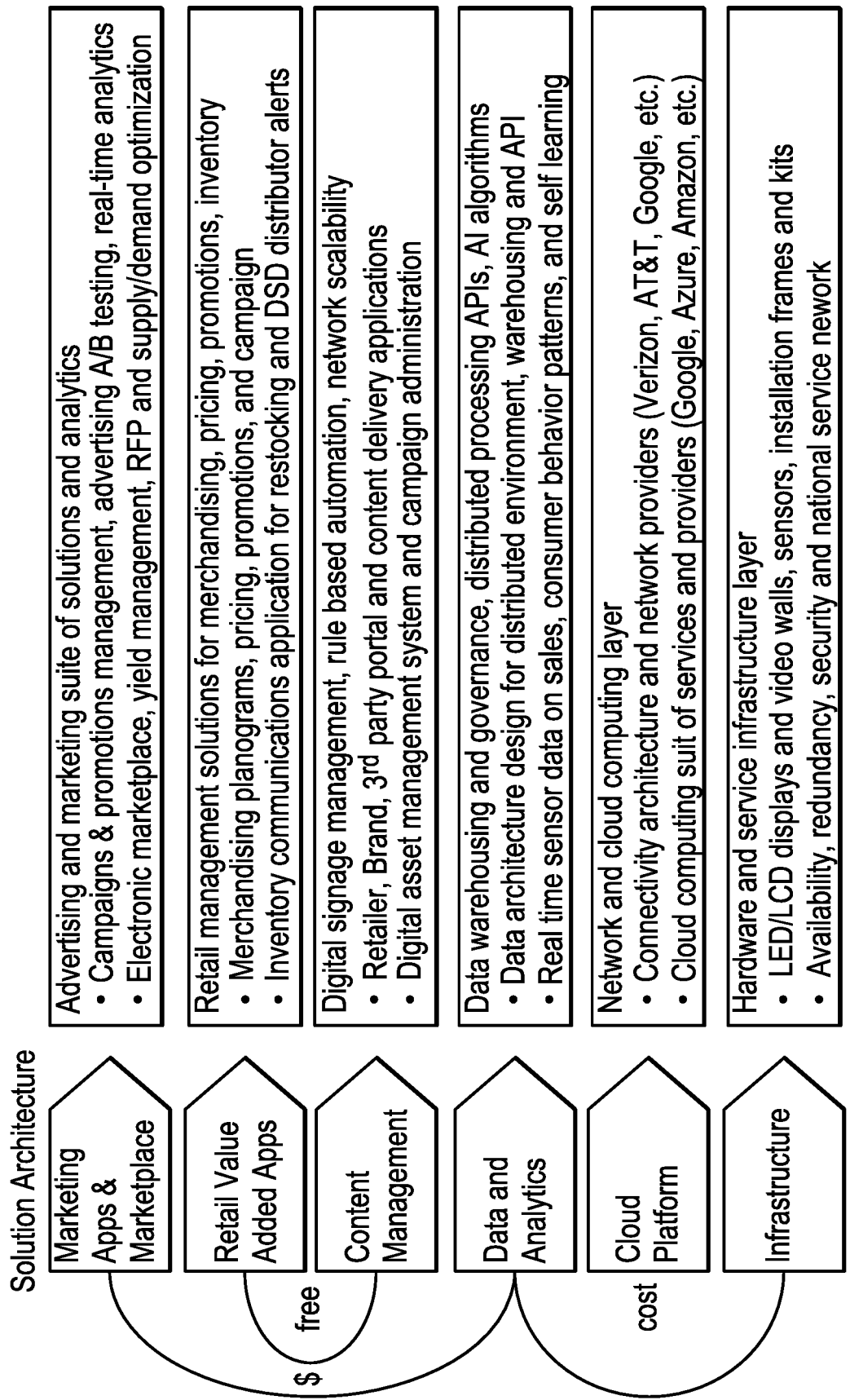
FIG. 3 illustrates solution architecture of the intelligent marketing and advertising platform.
Figure 4:
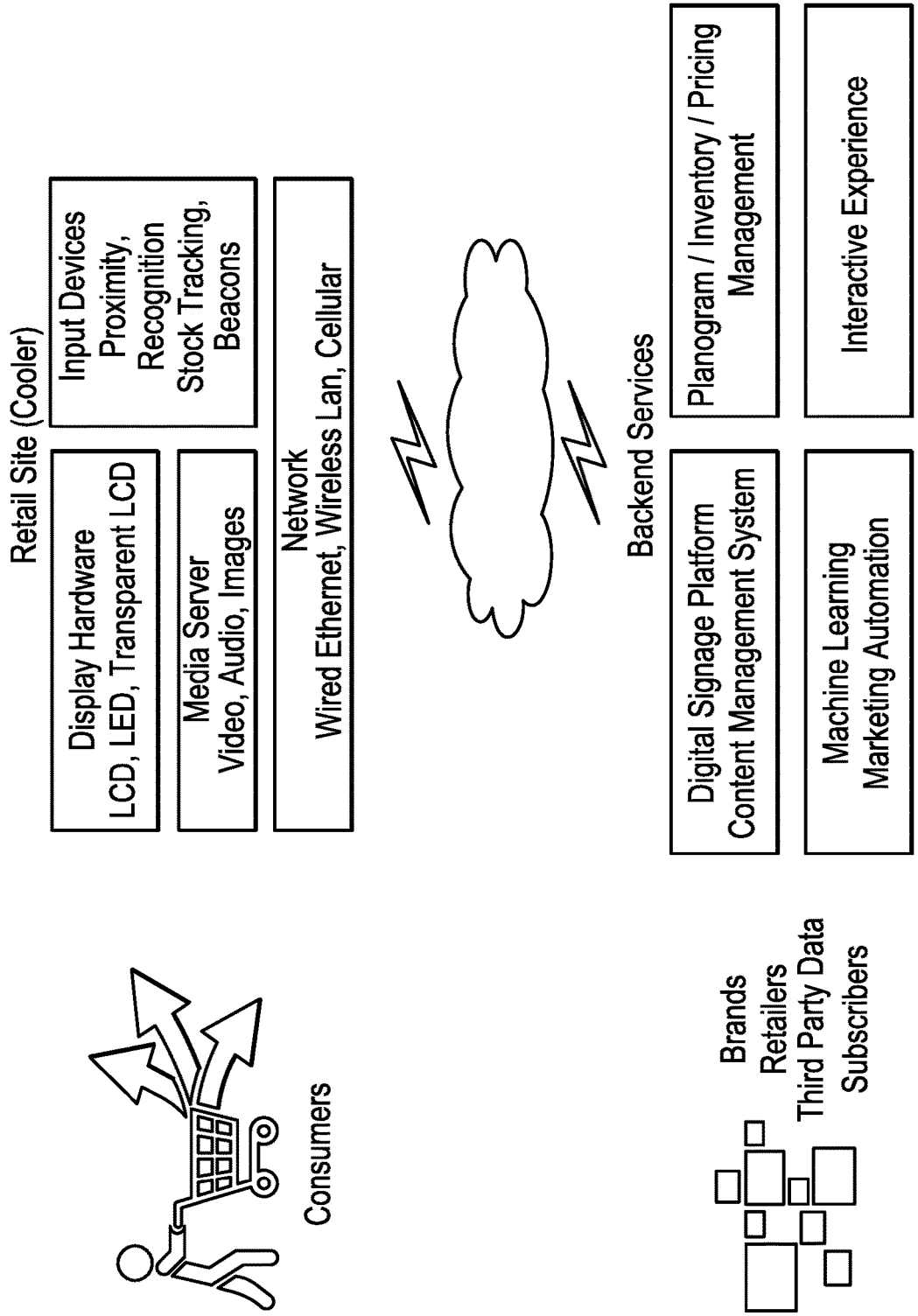
FIG. 4 illustrates one possible platform stack of the intelligent marketing and advertising platform.
Figure 5:
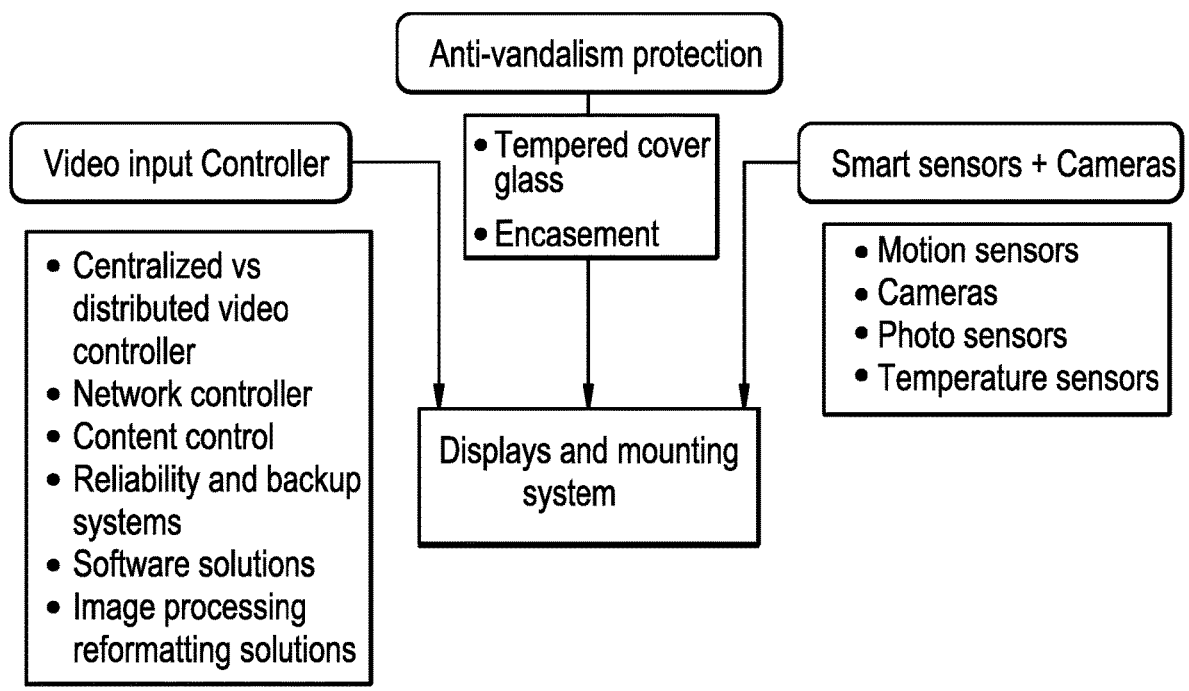
FIG. 5 illustrates one possible system architecture which can be implemented in connection with the present invention.

FIG. 3 illustrates solution architecture of the intelligent marketing and advertising platform disclosed herein, FIG. 4 illustrates one possible platform stack of the intelligent marketing and advertising platform disclosed herein. FIG. 5 illustrates one possible system architecture which can be implemented in connection with the present invention. FIGS. 3-5 are self-explanatory.

While a specific embodiment of the invention has been shown and described, it is envisioned that those skilled in the art may devise various modifications without departing from the spirit and scope of the present invention.

What is claimed is:

1. An intelligent system for real-time inventory management, marketing, and advertising on a movable, non-transparent display on a surface of a retail product container, comprising:

a server comprising:

one or more server processors; and a server memory storing computer-executable instructions that, when executed by the one or more server processors, cause the server to:

identify, via image recognition using inventory-taking hardware affixed to a first retail product container, an inventory of one or more retail products physically contained in the first retail product container of a plurality of retail product containers;

generate a planogram of the one or more retail products physically contained in the first retail product container;

display, on at least one non-transparent display on a surface of the first retail product container, the planogram, wherein the at least one non-transparent display blocks viewability from outside of the first retail product container of the one or more retail products physically contained in the first retail product container;

determine, in real-time, current pricing information regarding the one or more retail products physically contained in the first retail product container; and display, on the at least one non-transparent display, the current pricing information regarding the one or more retail products physically contained in the first retail product container;

receive, using customer-detecting hardware at the first retail product container, first real-time sensor data of a customer; and generate a promotion of a retail product of the one or more retail products for the customer based on behavioral analytics.

2. The system of claim 1, further storing computer-executable instructions that, when executed by the one or more server processors, cause the server to:

transmit data to a distributor and/or store regarding overall stock relating to the inventory of the one or more retail products of each of the plurality of retail product containers.

3. The system of claim 1, wherein the at least one non-transparent display on the surface of the first retail product is movable from an open position to a closed position, and wherein when in the closed position, the one or more retail products physically contained in the first retail product container are blocked from viewability from outside the first retail product container.

4. The system of claim 1, further storing computer-executable instructions that, when executed by the one or more server processors, cause the server to:

display, on the at least one non-transparent display on the surface of the first retail product container, the promotion of the retail product.

5. The system of claim 1, further storing computer-executable instructions that, when executed by the one or more server processors, cause the server to:

receive, via a means for customer detection at a second retail product container of the plurality of retail product containers, a second real-time sensor data of the customer, wherein the means for customer detection activates when the customer is within three feet; and display, on at least one non-transparent display on the surface of a second retail product container, the promotion of the retail product for the customer.

6. The system of claim 1, further storing computer-executable instructions that, when executed by the one or more server processors, cause the server to:

determine, based on the determined inventory of the one or more retail products physically contained in the first retail product container of the plurality of retail product containers, a shortage of at least one of the one or more retail products; and generate, based on the determined shortage, a restock order or a direct store delivery (DSD) alert for at least one of the one or more retail products.

7. The system of claim 1, further storing computer-executable instructions that, when executed by the one or more server processors, cause the server to:

receive real-time sales data of the one or more retail products physically contained in the first retail product container;

perform a supply and demand optimization of the one or more retail products; and display, on the at least one non-transparent display on the surface of the first retail product container, a promotion of at least one of the one or more retail products physically contained in the first retail product container.

8. The system of claim 1, further comprising:

the plurality of retail product containers, wherein each retail product container is communicatively linked to the server over a network, and wherein each retail product container comprises:

an internal storage volume storing the one or more retail products;

at least one non-transparent display on a surface of each retail product container that prohibits viewing of the internal storage volume of the retail product container;

a customer-detecting hardware; and an inventory-taking hardware, wherein the inventory-taking hardware comprises one or more cameras and is configured to collectively measure and learn to communicate the planogram.

9. A method involving a movable, non-transparent display on a surface of a retail product container, the method comprising:

determining, by a processor using image recognition, an inventory of one or more retail products physically contained in a first retail product container of a plurality of retail product containers;

generate, by the processor, a planogram of the one or more retail products physically contained in the first retail product container;

displaying, on at least one non-transparent display on a surface of the first retail product container, the planogram, wherein in a closed position, the at least one non-transparent display blocks viewability from outside of the first retail product container of the one or more retail products physically contained in the first retail product container;

determining, by the processor, current pricing information regarding the one or more retail products physically contained in the first retail product container; and displaying, on the at least one non-transparent display on the surface of the first retail product container, the current pricing information; and transmitting, by the processor, data to a distributor and/or store regarding overall stock relating to inventory of the one or more retail products of each of the plurality of retail product containers, wherein each of the plurality of retail product containers is associated with the distributor and/or store; and generating, by the processor, a promotion of a retail product of the one or more retail products for a customer based on behavior analytics, wherein the retail product is physically contained in the first retail product container, and wherein the promotion is configured to be displayed on the non-transparent display.

10. The method of claim 9, further comprising:
displaying, on at least one non-transparent display on a surface of the at least one of the one or more retail product containers, the promotion of the retail product.

11. The method of claim 9, further comprising:
determining, based on the determined inventory of the one or more retail products physically contained in the first retail product container of the plurality of retail product containers, a shortage of at least one of the one or more retail products; and
generating, by the processor, based on the determined shortage, a restock order or a direct store delivery (DSD) alert for at least one of the one or more retail products.

12. A system comprising:
a plurality of retail product containers, wherein each retail product container comprises
  an internal storage volume storing one or more retail products;
  at least one non-transparent display on a surface of the retail product container that prohibits viewing of the internal storage volume of the retail product container;
  a customer-detecting hardware; and
  an inventory-taking hardware; and
a server comprising:
  one or more server processors; and
  a server memory storing computer-executable instructions that, when executed by the one or more server processors, cause the server to:
    receive, from the inventory-taking hardware, an inventory of one or more retail products physically contained in the internal storage volume of the given retail product container of the plurality of retail product containers;
    generate, by the one or more server processors, a planogram of the one or more retail products physically contained in the given retail product container;
    displaying, on at least one non-transparent display on a surface of the given retail product container, the planogram, wherein in a closed position, the at least one non-transparent display blocks viewability from outside of the first retail product container of the one or more retail products physically contained in the first retail product container;
    determine, in real-time by the one or more server processors, current pricing information regarding the one or more retail products physically contained in the internal storage volume of the given retail product container;
    display the current pricing information regarding the one or more retail products physically contained in the internal storage volume of the given retail product container; and
    receive, via the customer-detecting hardware at the given retail product container, activation of the non-transparent display to display a promotion of a retail product for a customer, wherein the retail product is physically contained in the internal storage volume of the given retail product container.

13. The system of claim 12, wherein the at least one non-transparent display comprises an interactive touch-screen, and wherein the at least one non-transparent display on the surface of the given retail product container of the plurality of retail product containers is configured to:
display a planogram relating to the one or more retail products physically contained in the internal storage volume of the given retail product container.

14. The system of claim 12,
wherein the at least one non-transparent display on the surface of the given retail product container of the plurality of retail product containers is configured to:
display the promotion of the retail product for the customer.

* * * * *